(12) United States Patent
Giebeler

(10) Patent No.: US 8,637,823 B2
(45) Date of Patent: Jan. 28, 2014

(54) INFRARED LIGHT DETECTOR AND PRODUCTION THEREOF

(75) Inventor: Carsten Giebeler, Edinburgh (GB)

(73) Assignee: Pyreos Ltd., Edinburgh (GB)

( * ) Notice: Subject to any disclaimer, the term of this patent is extended or adjusted under 35 U.S.C. 154(b) by 140 days.

(21) Appl. No.: 13/125,527

(22) PCT Filed: Sep. 29, 2009

(86) PCT No.: PCT/EP2009/062632
§ 371 (c)(1),
(2), (4) Date: Jul. 21, 2011

(87) PCT Pub. No.: WO2010/046213
PCT Pub. Date: Apr. 29, 2010

(65) Prior Publication Data
US 2011/0272582 A1    Nov. 10, 2011

(30) Foreign Application Priority Data
Oct. 24, 2008    (DE) .......................... 10 2008 053 083

(51) Int. Cl.
*G01J 5/02*    (2006.01)

(52) U.S. Cl.
USPC .................................. 250/339.02; 250/338.4

(58) Field of Classification Search
USPC .................. 250/338.1, 338.4, 339.01, 339.02
See application file for complete search history.

(56) References Cited

U.S. PATENT DOCUMENTS

| | | | |
|---|---|---|---|
| 7,304,304 B2 | 12/2007 | Yamauchi et al. | |
| 7,417,229 B2 * | 8/2008 | Sasaki et al. | 250/338.1 |
| 7,795,586 B2 | 9/2010 | Krummel et al. | |
| 2003/0141455 A1 | 7/2003 | Lambert et al. | |
| 2003/0173499 A1 | 9/2003 | Cole et al. | |
| 2008/0061237 A1 | 3/2008 | Franz et al. | |
| 2008/0202209 A1 | 8/2008 | Lambkin et al. | |

FOREIGN PATENT DOCUMENTS

| | | |
|---|---|---|
| DE | 102 43 014 A1 | 3/2004 |
| DE | 10339319 A1 | 3/2005 |
| DE | 10 2004 031 315 A1 | 1/2006 |
| DE | 10 2005 061 818 A1 | 7/2006 |
| DE | 102004002163 A1 | 8/2008 |
| EP | 0889306 A1 | 1/1999 |
| WO | 0150101 A1 | 7/2001 |

OTHER PUBLICATIONS

"Integrated Gating/Detector Array Fabricated in Silicon Using Micromachining Technique," Kwa et al. Sensors and Actuators A, vol. 31 (1992) United States patent practice 259-266.

* cited by examiner

*Primary Examiner* — Mark R Gaworecki
(74) *Attorney, Agent, or Firm* — Sughrue Mion, PLLC

(57) ABSTRACT

An infrared light detector has a first substrate having a sensor chip thereon that has an exposure surface that can be irradiated with infrared light, the sensor chip converting the incident infrared light into an electrical signal. The infrared light detector also has a second substrate having a window therein that is located adjacent to the exposure surface of the sensor chip, the window masking infrared light of a predetermined wavelength. The size (dimensions) of the window and the distance of the window with respect to the exposure surface are dimensioned to cause infrared light passing through the window to completely strike the exposure area of the sensor chip.

17 Claims, 2 Drawing Sheets

INFRARED LIGHT DETECTOR AND PRODUCTION THEREOF

BACKGROUND OF THE INVENTION

1. Field of the Invention

The invention concerns an infrared light detector, a method to produce the infrared light detector and the use of the infrared light detector as a sensor to detect gas.

2. Description of the Prior Art

To detect gas it is known to use infrared light that lies within a wavelength range from 3 to 5 µm. The gas to be detected is exposed with a light source that is suitable to emit the infrared light in this wavelength range, wherein a portion of the infrared light is absorbed by the gas so that a residual light remains. The residual light can be measured with an infrared light sensor with which the wavelength range and/or the intensity of the residual light can be detected and can correspondingly be transduced into an electrical signal. Given a suitable evaluation the type and the content of the detected gas can be concluded on the base of the electrical signal.

A conventional infrared light sensor 101 is shown in FIG. 4, which infrared light sensor 101 has a substrate 102 that is obtained from a silicon wafer, for example. Multiple sensor chips 103 are mounted on the silicon wafer in a grid arrangement. The infrared light sensor 101 also has a pot-like TO housing 104 that covers the substrate 102 with the sensor chips 103 so that the sensor chips 103 are sealed from the environment with the TO housing 104. A filter 105 that is fashioned as an infrared light filter is installed in the top side of the TO housing 104 above every sensor chip 102.

According to FIG. 4, three sensor chips 103 with their filters 105 are provided in the infrared light sensor 101, wherein a left sensor chip filter pair, a middle sensor chip filter pair and a right sensor chip filter pair are shown.

The left filter 105 is set up such that it masks light with that wavelength that is absorbed by a gas type A. The middle filter 105 is designed for a gas type B and the right filter 105 is designed for a gas type C. If the gas to be detected includes the gas type A and strikes the residual light of the gas to be detected at the TO housing 104, the residual light passes through the filter 105 inside the TO housing 104. No light portion is filtered out of the residual light by the left filter 105, in contrast to which a corresponding light portion (component) is filtered out by the middle filter 105 and the right filter 105. The residual light that passed through the left filter 105 thus strikes the left sensor chip 103 that is then fully activated. In contrast to this, the middle sensor chip 103 and the right sensor chip 103 do not fully activate since the light that passed through the filter 105 associated with it is attenuated correspondingly by the filter effect of the filter 105. A detection of the gas type A results from the individual activation of the sensor chips 103.

The residual light passing through the left filter 105 is shown demarcated by a first light ray 106 and a second light ray 107 in FIG. 4. Due to a scatter effect of the left filter 105 on the residual light passing through it and/or due to a system-dependent variation of the gas detector system, the light rays 106 and 107 form a light bundle fanning out from the left filter 105 to the sensor chips 103. An exposure surface enclosed by the light rays 106 and 107 results from this on the substrate 102. It is desirable that the right sensor chip 103 and the middle sensor chip 103 lie outside of the exposure area since an illumination of the middle sensor chip 103 (for example) as is shown in FIG. 4 can lead to misinterpreted activation of the sensor chips 103. The TO housing 104 is conventionally made of metal. Depending on the manufacture, the height of the TO housing is 1 to 2 mm. A necessary minimum distance of 0.1 to 1 mm results from this between the individual sensor chips 103 so that, for example, the middle sensor chip 103 lies outside of the exposure area of the left sensor chip 103. A large overall width of the arrangement of the sensor chips 103 results from this, so the dimensions of the substrate 102 of corresponding size must be provided. The infrared light sensor 101 could alternatively be equipped with only one sensor chip filter pair, such that multiple such infrared light sensors 101 would be necessary to detect multiple gas types. However, the cost of such multiple infrared light sensors 101 would be too high.

SUMMARY OF THE INVENTION

An object of the invention to provide an infrared light detector, a method to produce the infrared light detector and a use of the infrared light detector, wherein the infrared light detector has a small structural space is cost-effective to produce.

The infrared light detector according to the invention has a first substrate that has a sensor chip with an exposure area that can be exposed with infrared light that can be transduced by the sensor chip into an electrical signal, and a second substrate that has a window that is arranged directly adjacent to the exposure area and masks infrared light of a predetermined wavelength, and the measurements of the window and its distance from the exposure area are dimensioned such that the infrared light that is transmitted by the window completely strikes the sensor chip.

The second substrate can be mounted at a small distance directly above the first substrate, so the window is arranged nearly directly adjacent to the sensor chip; the route of light that has passed through the window to the sensor chip is thereby small, such that the region of the first substrate that is illuminated by the scattered light is small. The infrared light detector according to the invention thereby advantageously has a small structural size. The infrared light detector with its two substrates is also simple and cost-effective to produce.

The method according to the invention to produce the infrared light detector has the steps: attach a sensor chip to a first substrate; bond a second substrate to the first substrate so that the sensor chip is covered by the second substrate; produce a window in the second substrate such that the window is arranged directly adjacent to the sensor chip, and arranging the window such that infrared light of a predetermined wavelength is masked by the window, and dimensioning the window and its distance from the sensor chip such that the infrared light that passes through the window completely strikes the sensor chip.

According to the invention, the infrared light detector is used as a sensor to detect gas.

The window is preferably arranged integrated on the top side of the second substrate that faces away from the first substrate and/or into the second substrate, wherein the distance between the window and the exposure area is between 10 and 700 µm.

The window is preferably an infrared light filter formed from a multilayer infrared absorption layer/dielectric layers/and/or an optical diffraction element. The multilayer infrared absorption layer is a layer arrangement that can be structured with photolithograpy or laser ablation of thin film layers and can be applied on the substrate with known commercial methods. The optical diffraction element has a combination of metal layers and/or dielectric layers in which a structure is etched whose dimension amounts to approximately a fourth of the wavelength of the light that is filtered by the optical diffraction element. The proportion of the light with a wavelength that cannot pass through the optical diffraction element is reflected at the metal layer.

The first substrate and/or the second substrate are produced from a silicon wafer and/or a sapphire. The infrared light detector produced with its substrates is thereby advantageously produced within the scope of the possibilities of semiconductor manufacturing.

The first substrate has a number of sensor chips and the second substrate has a number of windows, one of the windows (which are associated with a respective sensor chip) being aligned on a respective sensor chip and the sensor chips and their windows being arranged in a grid arrangement.

Because the distance between the window and the exposure area is between 10 and 700 μm, the region of the first substrate that is illuminated by scattered light is advantageously small. The sensor chips can thus be arranged densely adjoining one another on the first substrate, without light that has passed through one of the windows striking one of the sensor chips that are not associated with this window. The infrared light detector is thus to be provided with a high spatial density of sensor chips, although the sensor chips have no fuzziness with regard to their activation. Moreover, relative to the number of sensor chips provided on the first substrate the size of the first substrate and that of the second substrate are small, such that the material consumption in the production of the substrate from the silicon wafer is small. The production of the infrared light detector is thereby cost-effective.

The windows preferably mask infrared light of a respective different, predetermined wavelength. Infrared light with the different wavelengths thereby passes from the windows to the sensor chips, such that the sensor chips activate accordingly given a diverse infrared light composition.

The second substrate is preferably bonded to the first substrate. The infrared light detector thereby has a stable mechanical bond between the first substrate and the second substrate, wherein the substrate is arranged at only a small distance from the first substrate.

The infrared light detector preferably has a third substrate that is arranged on the side of the first substrate that faces away from the second substrate. The third substrate preferably has an evaluation circuit to evaluate an electrical signal of the sensor chip. An activation of the sensor chip that leads to the electrical signal of the sensor chip can be evaluated by the evaluation circuit. The evaluation circuit is preferably integrated into the third substrate and/or settled outside of the third substrate. If the evaluation circuit is arranged integrated into the third substrate, the infrared light detector has a compact design. It is also preferred that the third substrate is made of a silicon wafer.

The optical diffraction element preferably has a dielectric layer and a housing that is designed to be internally reflecting and houses the dielectric layer, which housing has an entrance opening at the side facing away from the sensor chip and an exit opening at the side facing towards the sensor chip, which exit opening is arranged offset relative to the entrance opening such that the portion of infrared light that enters through the entrance opening and that cannot be injected into the dielectric layer is completely reflected back by the housing through the entrance opening, and said housing has at least one side wall that is arranged angled such that the portion of infrared light that enters through the entrance opening and that can be injected through the entrance opening can be reflected by the at least one side wall through the exit opening towards the sensor chip.

Moreover, it is preferred that in the production of the infrared light detector the window is produced as an infrared light window that is a multilayer infrared absorption layer and/or an optical diffraction element. The method to produce the infrared light sensor preferably includes: remove material of the second substrate at the surface facing away from the first substrate, such that the window is for exposure with infrared light is uncovered. The method also preferably includes: bond a third substrate to the side of the first substrate that is facing away from the sensor chip.

DESCRIPTION OF THE PREFERRED EMBODIMENTS

Figure 1:
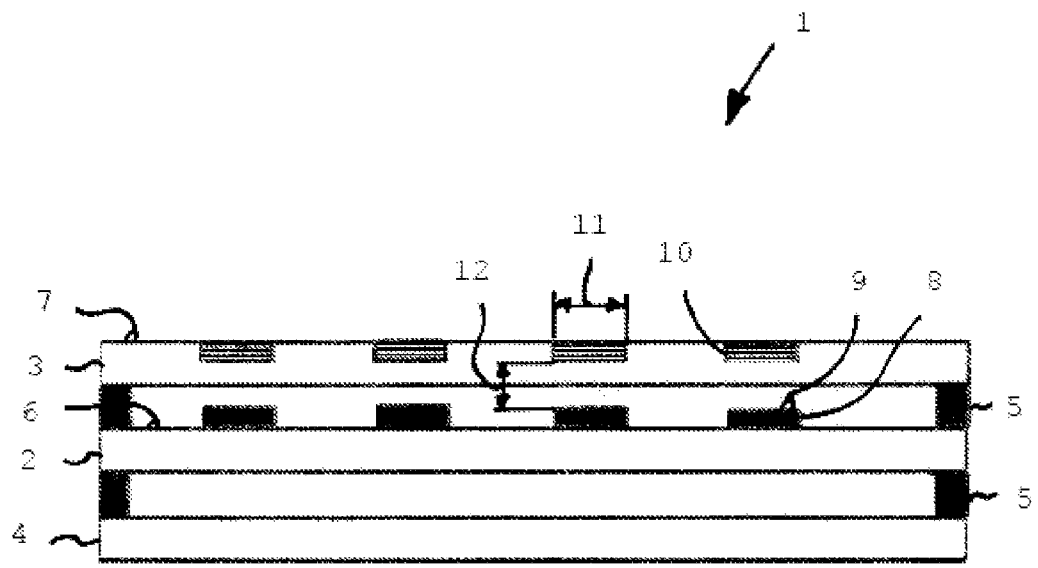
FIG. 1 is a cross section of a first embodiment of the infrared light detector according to the invention.

As is apparent from FIG. 1, an infrared light detector 1 has a first substrate 2 that is fashioned as a plate. The infrared light detector 1 also has a second substrate 3 that has the same dimensions as the first substrate 2 and is arranged at a distance above (as viewed in FIG. 1) the first substrate 2. A third substrate 4 that has the same dimensions as the first substrate 2 is provided below (as viewed in FIG. 1) the first substrate at a distance. Both the second substrate 3 and the third substrate 4 are fastened at their outer edges to the first substrate 2 by means of a bonded attachment 5, such that one cavity is fashioned between the first substrate 2 and the second substrate 3 and another cavity is fashioned between the first substrate 2 and the third substrate 4.

Four sensor chips 8 that are located at identical distances from one another are arranged on the top side 6 of the first substrate 2. Each sensor chip 8 respectively has an exposure area 9 at its top side. A window 10, integrated into the second substrate 3, is respectively provided above each sensor chip 8, wherein each window is aligned vertically with the sensor chip associated with it. The windows 10 in the second substrate 3 are arranged terminating flush with the top side 7 of the second substrate 3.

Each of the windows 10 is fashioned as an infrared light window, but each of the windows 10 filters out infrared light at a different wavelength. Infrared light that passes through one of the windows 10 enters into the cavity between the first substrate 2 and the second substrate 3 and strikes the exposure area 9 of the sensor chip 8 that is associated with the window 10. The sensor chip 8 activates corresponding to the intensity of the light striking the exposure area 9 and outputs an electrical signal. This signal can be evaluated in an evaluation circuit (not shown) of the infrared light detector 1, so the infrared light passing through the window 10 can be detected.

The width 11 of the window 10 and its distance 12 from the exposure area 9 are selected such that, due to a light scattering effect, the infrared light that passes through one of the windows 10 completely strikes the exposure area 9 of the sensor chip 8 associated with it. A different sensor chip 8 adjacent to this sensor chip 8 is thereby not illuminated by this light.

Because the infrared light detector 1 has a first substrate 2 and a second substrate 3, wherein the sensor chips 8 are arranged on the first substrate 2 and the windows 10 are arranged in the second substrate 3, and the first substrate 2 is mechanically connected via bonding with the second substrate 3, the infrared light detector 1 has a compact design and a high activation precision of the sensor chips 8.

Figure 2:
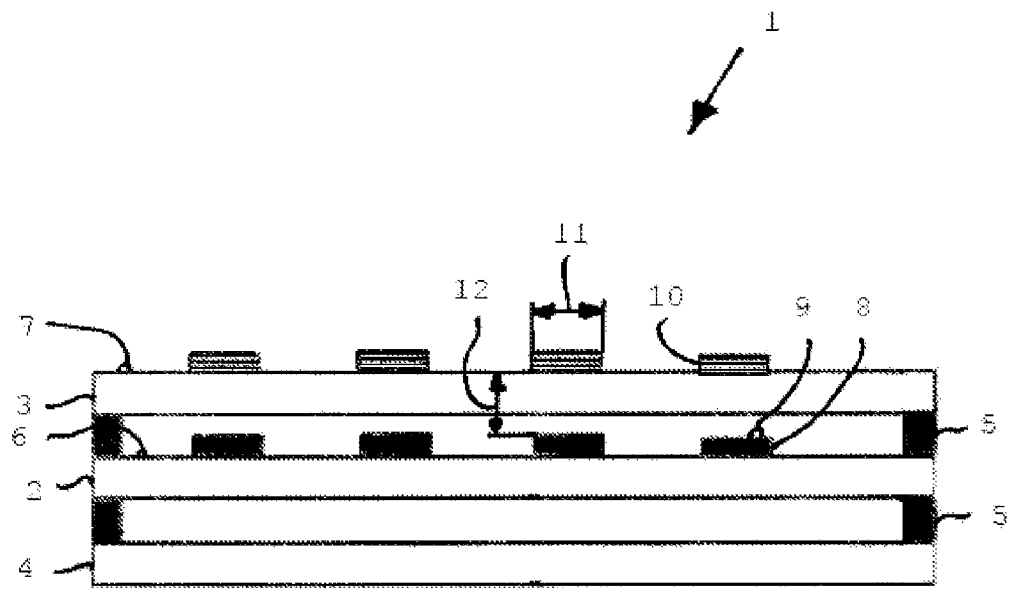
FIG. 2 is a cross section of a second embodiment of the infrared light detector according to the invention.

The embodiment of the infrared light detector 1 that is shown in FIG. 2 differs from the embodiment of the infrared light detector shown in FIG. 1 in that the window 10 as it is shown in FIG. 1 is not integrated into the second substrate 3 but rather is arranged on the top side 7 of the second substrate 3.

Figure 3:
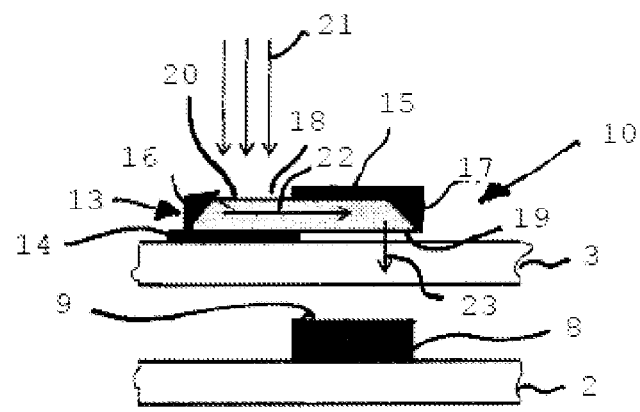
FIG. 3 is a section of the second embodiment from FIG. 2, wherein the window is an optical diffraction element.
Figure 4:
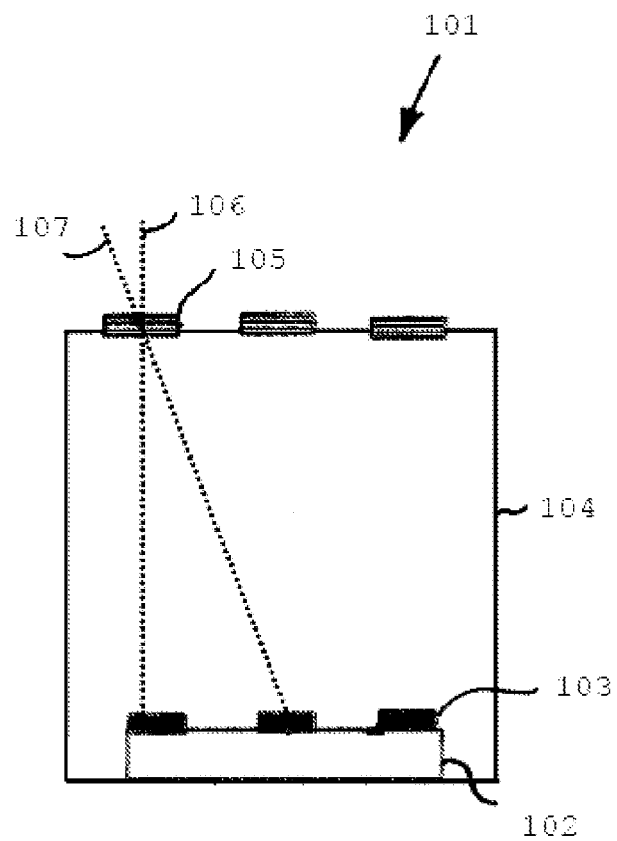
FIG. 4 is a cross section of a conventional infrared light sensor.

According to FIG. 3, for the embodiment shown in FIG. 2 the window 10 is provided as an optical diffraction element 13. The optical diffraction element 13 has a housing having a base 14, a cover 15 and a first side wall 16 and a second side wall 17. The housing is made of metal and designed to be internally reflective. A dielectric layer 20 is arranged in the housing. The cover 15 has an entrance opening 18 and the base 14 has an exit opening 19 that is arranged above the sensor chip 8. Light 21 can penetrate into the optical diffraction element 13 via the entrance opening 18. The entrance opening 18 and the exit opening 19 are arranged offset relative to one another, such that the entrance opening 18 and the exit opening 19 do not overlap relative to the direction of incidence of the incoming light 21. The entrance opening 18 is arranged opposite the base 14 with regard to the direction of incidence of the incoming light 21. The portion of incoming light 21 that is injected into the dielectric layer is thus reflected at the floor 14, such that this portion is radiated away again via the entrance opening 18. The other portion 22 of the incoming light that is injected into the dielectric layer 20 is conducted to the right 21 (as seen in FIG. 3) and left (not shown) in the dielectric layer.

The housing also has a first side wall 16 and a second side wall 17, wherein the first side wall 16 is arranged immediately adjacent to the inlet opening 18 and the second side wall is arranged immediately adjacent to the outlet opening 19. The second side wall 17 is arranged at such an angle in order to conduct the injected light 22 towards the sensor chip 8. The first side wall 16 is arranged opposite the second side wall 17 and angled such that the portion of incoming light 21 that was injected to the left into the dielectric layer is reflected towards the second side wall 17. A high efficiency is thereby achieved with the optical diffraction element 13.

The cover 15 is also arranged so that the exit opening 19 is occluded by the cover 15 with regard to the direction of incidence of the incoming light 21. The sensor chip is thereby protected from the direct exposure by the incident light 21.

Although modifications and changes may be suggested by those skilled in the art, it is the intention of the inventor to embody within the patent warranted heron all changes and modifications as reasonably and properly come within the scope of his contribution to the art.

The invention claimed is:

1. An infrared light detector comprising:
a first substrate comprising a sensor chip having an exposure area, said sensor chip being configured to transduce infrared light that strikes said exposure area into an electrical signal; and
a second substrate having a window therein, said second substrate and said window being located relative to said first substrate to place said window adjacent to said exposure area, said window being configured to mask infrared light of a predetermined wavelength;
wherein said window has a size and is located at a distance from said exposure area that are dimensioned to cause infrared light that passes through the window to strike solely said exposure area of said sensor chip, and wherein said window is an infrared light filter formed by an infrared absorption layer and at least one further layer selected from the group consisting of a dielectric layer and an optical diffraction element layer.

2. An infrared light detector as claimed in claim 1, wherein the distance between said window and said exposure area is in a range between 10 and 700 micrometers, and wherein said window is located at a location selected from the group consisting of (a) integrated on a top side of said second substrate that faces away from said first substrate, and (b) integrated into said second substrate.

3. An infrared light detector as claimed in claim 1 wherein at least one of said first substrate and said second substrate is composed of material selected from the group consisting of silicon and sapphire.

4. An infrared light detector comprising:
a first substrate comprising a sensor chip having an exposure area, said sensor chip being configured to transduce infrared light that strikes said exposure area into an electrical signal; and
a second substrate having a window therein, said second substrate and said window being located relative to said first substrate to place said window adjacent to said exposure area, said window being configured to mask infrared light of a predetermined wavelength;
wherein said window has a size and is located at a distance from said exposure area that are dimensioned to cause infrared light that passes through window strike solely said exposure area of said sensor chip, wherein said sensor chip is a first sensor chip, wherein said first substrate comprises at least one further sensor chip in addition to said first sensor chip, wherein said window is a first window, and wherein said second substrate comprises at least one further window in addition to said first window, each window in said second substrate being associated and aligned with a respective one of the sensor chips of said first substrate.

5. An infrared light detector as claimed in claim 4 wherein each window in said second substrate respectively masks infrared light of a mutually differing predetermined wavelength.

6. An infrared light detector as claimed in claim 4 wherein said second substrate is bonded to said first substrate.

7. An infrared light detector as claimed in claim 4 comprising a third substrate located at a side of said first substrate that faces away from said second substrate.

8. An infrared light detector as claimed in claim 7 wherein said third substrate comprises an evaluation circuit that evaluates the electrical signal of said sensor chip.

9. An infrared light detector as claimed in claim 8 wherein said evaluation circuit is located at a position selected from the group consisting of (a) integrated into said third substrate and (b) attached at an exterior of said third substrate.

10. An infrared light detector as claimed in claim 8 wherein said third substrate is comprised of material selected from the group consisting of silicon and sapphire.

11. An infrared light detector as claimed in claim 4, wherein said sensor chips and said respectively aligned windows are arranged in respective grid arrangements.

12. An infrared light detector as claimed in claim 4 wherein said window is an infrared light filter formed by an infrared absorption layer and at least one further layer selected from the group consisting of a dielectric layer and an optical diffraction element layer.

13. An infrared light detector as claimed in claim 4, wherein the distance between said window and said exposure area is in a range between 10 and 700 micrometers, and wherein said window is located at a location selected from the group consisting of (a) integrated on a top side of said second substrate that faces away from said first substrate, and (b) integrated into said second substrate.

14. An infrared light detector comprising:
- a first substrate comprising a sensor chip having an exposure area, said sensor chip being configured to transduce infrared light that strikes said exposure area into an electrical signal; and
- a second substrate having a window therein, said second substrate and said window being located relative to said first substrate to place said window adjacent to said exposure area, said window being configured to mask infrared light of a predetermined wavelength;
- wherein said window has a size and is located at a distance from said exposure area that are dimensioned to cause infrared that passes through the window to strike solely said exposure area of said sensor chip,
- wherein said window comprises an optical diffraction element comprising a dielectric layer and a housing, said housing being internally reflective and containing said dielectric layer, said housing comprising an entrance opening at a side thereof, facing away from said sensor chip, and an exit opening at a side thereof facing said sensor chip, said exit opening being located offset relative to said entrance opening and said offset causing a portion of the infrared light that enters through said exit opening and that is not injected into said dielectric layer to be completely reflected back through said entrance opening by the internal reflection of said housing, and said housing comprising at least one sidewall located at an angle that causes another portion of the infrared light that enters through said exit opening, and that is injected into said dielectric layer to be reflected by said sidewall through said exit opening toward said sensor chip.

15. A method to manufacture an infrared light detector, comprising:
- attaching a sensor chip to a first substrate, said sensor chip comprising an exposure area and being configured to transduce infrared light that strikes said exposure area into an electrical signal;
- bonding a second substrate to said first substrate with said sensor chip being covered by said second substrate;
- producing a window in said second substrate that masks infrared light of a predetermined wavelength, and providing said window with a size and locating said window at a distance from said sensor chip with dimensions that cause infrared light that passes through said window to strike solely said exposure area of said sensor chip, and
- forming said window as an infrared light filter comprising layers selected from the group consisting of an infrared absorption layer and an optical diffraction element layer.

16. A method as claimed in claim 15, wherein producing said window comprises removing material of said second substrate at a surface thereof facing away from said first substrate.

17. A method as claimed in claim 15, further comprising bonding a third substrate to said first substrate at a side of said first substrate at which said sensor chip is located, and providing an evaluation circuit at said third substrate that evaluates the electrical signal.

* * * * *